United States Patent
Mueller et al.

(10) Patent No.: US 7,325,537 B2
(45) Date of Patent: Feb. 5, 2008

(54) METHOD, COMPUTER PROGRAM, AND CONTROL AND/OR REGULATING UNIT FOR OPERATING AN INTERNAL COMBUSTION ENGINE

(75) Inventors: Uwe Mueller, Hemmingen (DE); Bernd Schroeder, Esslingen (DE); Timm Hollmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 11/285,064

(22) Filed: Nov. 23, 2005

(65) Prior Publication Data

US 2006/0169250 A1    Aug. 3, 2006

(30) Foreign Application Priority Data

Nov. 24, 2004  (DE) ............... 10 2004 056 665

(51) Int. Cl.
*F02M 37/04*    (2006.01)
(52) U.S. Cl. ................... 123/506; 123/446
(58) Field of Classification Search ........... 123/500, 123/501, 456, 506, 458, 446; 239/88–95
See application file for complete search history.

(56) References Cited

U.S. PATENT DOCUMENTS

| | | | | |
|---|---|---|---|---|
| 4,378,775 A | * | 4/1983 | Straubel et al. | 123/458 |
| 4,503,825 A | * | 3/1985 | Schneider | 123/446 |
| 4,574,756 A | * | 3/1986 | Ito et al. | 123/357 |
| 5,697,343 A | * | 12/1997 | Isozumi et al. | 123/446 |
| 6,135,090 A | * | 10/2000 | Kawachi et al. | 123/446 |
| 6,447,273 B1 | * | 9/2002 | Nishimura et al. | 417/505 |
| 6,523,526 B2 | * | 2/2003 | Schwarz | 123/506 |
| 6,655,362 B2 | * | 12/2003 | Rembold et al. | 123/506 |
| 6,715,470 B2 | * | 4/2004 | Takahashi | 123/458 |
| 2004/0000289 A1 | * | 1/2004 | Seo et al. | 123/447 |

* cited by examiner

*Primary Examiner*—Carl S. Miller
(74) *Attorney, Agent, or Firm*—Ronald E. Greigg (57) ABSTRACT

A high-pressure fuel pump and methods for controlling this high-pressure fuel pump are described in which the pumping quantity regulation does not cause significant heating of the fuel to be pumped. The partial-load efficiency of the high-pressure fuel pump, triggered in accordance with the invention, is also very good.

14 Claims, 5 Drawing Sheets

METHOD, COMPUTER PROGRAM, AND CONTROL AND/OR REGULATING UNIT FOR OPERATING AN INTERNAL COMBUSTION ENGINE

CROSS-REFERENCE TO RELATED APPLICATIONS

This application is based on German Patent Application 10 2004 056 665.8 filed Nov. 24, 2004, upon which priority is claimed.

BACKGROUND OF THE INVENTION

1. Field of the Invention

The invention is directed to an improved high-pressure fuel pump for an internal combustion engine, the pump having a piston oscillating in a cylinder, in which the cylinder and the piston define a pumping chamber, and the pumping chamber communicates on the intake side with a low-pressure fuel line and on the compression side with a high-pressure fuel line, and having a quantity control valve located between the low-pressure line and the pumping chamber.

2. Description of the Prior Art

High-pressure fuel pumps of the type with which this invention is concerned are known, for instance from German Patent Disclosure DE 198 34 120 A1, DE 100 52 629 A1, or DE 102 00 987 A1. In all these high-pressure fuel pumps, the pumping quantity of the high-pressure pump is controlled by limiting the pumping of the fuel from the pumping chamber into the high-pressure fuel line during the pumping stroke. In the preceding intake stroke, when the piston moves from top dead center TDC to bottom dead center BDC, the pumping chamber becomes completely filled with fuel. As a consequence, in partial-load operation of the high-pressure pump, the fuel not pumped into the high-pressure fuel line is pushed back into the low-pressure fuel line via the quantity control valve. This aspiration of fuel from the low-pressure fuel line into the pumping chamber and the ensuing at least partial pushing back of this fuel into the low-pressure fuel line impairs the partial-load efficiency of these high-pressure fuel pumps and leads to unwanted warming of the fuel. The diversion of the excess fuel quantity from the pumping chamber furthermore causes major pressure pulsations in the low-pressure fuel line. These pressure pulsations must be absorbed or reduced by a damping device. For safety reasons, because of these pressure pulsations, the entire low-pressure region of the fuel injection system must also be able to withstand very high pressures. This increases the costs for a fuel injection system considerably.

In a method for controlling the pumping quantity of a high-pressure fuel pump for an internal combustion engine, having a piston oscillating in a cylinder, in which the cylinder and the piston define a pumping chamber, and the pumping chamber communicates on the intake side with a low-pressure fuel line and on the compression side with a high-pressure fuel line, and having a quantity control valve located between the low-pressure fuel line and the pumping chamber, it is provided according to the invention that the hydraulic communication between the pumping chamber and the low-pressure fuel line is opened, while the piston is moving from top dead center in the direction of bottom dead center. Next, the hydraulic communication between the pumping chamber and the low-pressure fuel line is interrupted, as soon as the fuel quantity to be pumped has been aspirated into the pumping chamber. In a further step, the aspirated fuel quantity is pumped into the high-pressure fuel line while the piston is moving from bottom dead center in the direction of top dead center.

SUMMARY OF THE INVENTION

In the method of the invention, only as much fuel as is to be pumped into the high-pressure fuel line in the ensuing pumping stroke reaches the pumping chamber of the high-pressure fuel pump. Pumping fuel back and forth from the low-pressure fuel line into the pumping chamber and back again is thus avoided. As a consequence, the partial-load efficiency of the high-pressure fuel pump is markedly improved and heating of the fuel is reduced to the same extent.

Since high-pressure fuel pumps in injection systems are operated in the partial-load operating mode during virtually the entire time in operation, the improvement in the partial-load efficiency of the high-pressure fuel pump of the invention has a major effect on the overall utilization rate of the fuel injection system. Moreover, with the aid of the method of the invention, an intake valve between the low-pressure fuel line and the pumping chamber can be dispensed with.

When the intake phase begins at top dead center of the piston, the triggering of the quantity control valve is especially simple, above all at very small pumping quantities, since because of the sinusoidal course of the speed of the piston, the piston speed in the vicinity of top dead center is relatively slight, and hence the demands in terms of the precision of the triggering of the quantity control valve are relatively slight as well.

With the aid of a method for controlling the pumping quantity of a high-pressure fuel pump for an internal combustion engine, having a piston oscillating in a cylinder, in which the cylinder and the piston define a pumping chamber and the pumping chamber communicates on the intake side with a low-pressure fuel line and on the compression side with a high-pressure fuel line, and having a quantity control valve located between the low-pressure fuel line and the pumping chamber, the advantages of the invention can also be attained if the hydraulic communication between the pumping chamber and the low-pressure fuel line is interrupted as soon as the piston moves from top dead center in the direction of bottom dead center, and if the hydraulic communication between the pumping chamber and the low-pressure fuel line is opened long enough that the fuel quantity to be pumped is aspirated into the pumping chamber before the piston, on the way from bottom dead center to top dead center, has reached a position from which the aspirated fuel quantity can be pumped into the high-pressure fuel line, while the piston moves to top dead center. This method will be described in further detail hereinafter in conjunction with FIGS. 3-5.

In a further advantageous feature of the method of the invention, it may be provided that the hydraulic communication between the pumping chamber and the low-pressure fuel line is not opened until the piston has moved from bottom dead center in the direction of top dead center.

Also by means of a method for controlling the pumping quantity of a high-pressure fuel pump for an internal combustion engine, having a piston oscillating in a cylinder, in which the cylinder and the piston define a pumping chamber and the pumping chamber communicates on the intake side with a low-pressure fuel line and on the compression side with a high-pressure fuel line, and having a quantity control valve located between the low-pressure fuel line and the pumping chamber, the advantages of the invention are realized in that the hydraulic communication between the low-pressure fuel line and the pumping chamber can also be interrupted by the quantity control valve whenever the pressure in the pumping chamber is less than or equal to the vapor pressure of the pumped fuel, and the pumping pressure of a prefeed pump prevails in the low-pressure line.

In a high-pressure fuel pump according to the invention, the quantity control valve must be designed such that it also prevents the inflow of fuel from the low-pressure fuel line into the pumping chamber when vapor pressure prevails in the pumping chamber. Only in this way is it possible to suppress the inflow of fuel that is not pumped into the high-pressure fuel line in the ensuing pumping stroke. It is understood that in designing the quantity control valve, the pressure prevailing in the low-pressure fuel line must also be taken into account. Because of the design according to the invention of the quantity control valve, it is possible, if desired, to dispense with a check valve between the low-pressure fuel line and the pumping chamber. The high-pressure fuel pump is thus distinguished by a more simply engineered construction than other high-pressure fuel pumps with a quantity control valve that are known from the prior art.

Depending on requirements, it is possible to embody the quantity control valve as open when without current, or as closed when without current. The quantity control valve can also be embodied as opening outward or opening inward. Opening outward means that the opening motion of a valve member is effected counter to the pressure difference prevailing at the quantity control valve, while in an inward-opening valve, the opening motion of a valve member is reinforced by the pressure difference prevailing at the quantity control valve.

Further advantageous features of the high-pressure fuel pump provide that the quantity control valve has a spring-loaded valve member and an actuator. The valve member may be embodied as a valve plate, which cooperates with a valve seat. The actuator may be embodied as an electromagnet, a piezoelectric actuator, or a control motor.

To simplify the triggering of the quantity control valve and to relieve the associated control and/or regulating unit of the high-pressure fuel pump, it may be provided in a further advantageous feature that a check valve is provided between the quantity control valve and the pumping chamber. In advantageous embodiments of the invention, the quantity control valve and the check valve are combined into a structural unit, so that the assembly and testing of this unit can be done outside the high-pressure fuel pump.

In a further advantageous feature of the invention, a storage element is provided for a control apparatus of an internal combustion engine especially of a motor vehicle. A computer program is stored on the storage element and can be run on a computing apparatus, especially on a microprocessor. The storage element is, for example, configured as a read-only-memory, a random-access-memory or as a flash memory.

The present invention also relates to a computer program which can be run on a computing apparatus, especially on a microprocessor.

Finally, the invention relates to a control apparatus for an internal combustion engine, especially of a motor vehicle. The control apparatus serves for controlling the internal combustion engine.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

The construction of a fuel injection system 102 will be explained below in conjunction with the block circuit diagram shown in FIG. 1. The fuel injection system 102 includes a fuel tank 104, from which fuel 106 is pumped by an electric or mechanical prefeed pump 108. Via a low-pressure fuel line 110, the fuel 106 is pumped to a high-pressure fuel pump 111. From the high-pressure fuel pump 111, via a high-pressure fuel line 112, the fuel 106 reaches a common rail 114. A plurality of fuel injection nozzles or injectors 116 are connected to the common rail and inject the fuel 106 directly into combustion chambers 118 of an internal combustion engine, not shown.

Figure 2:
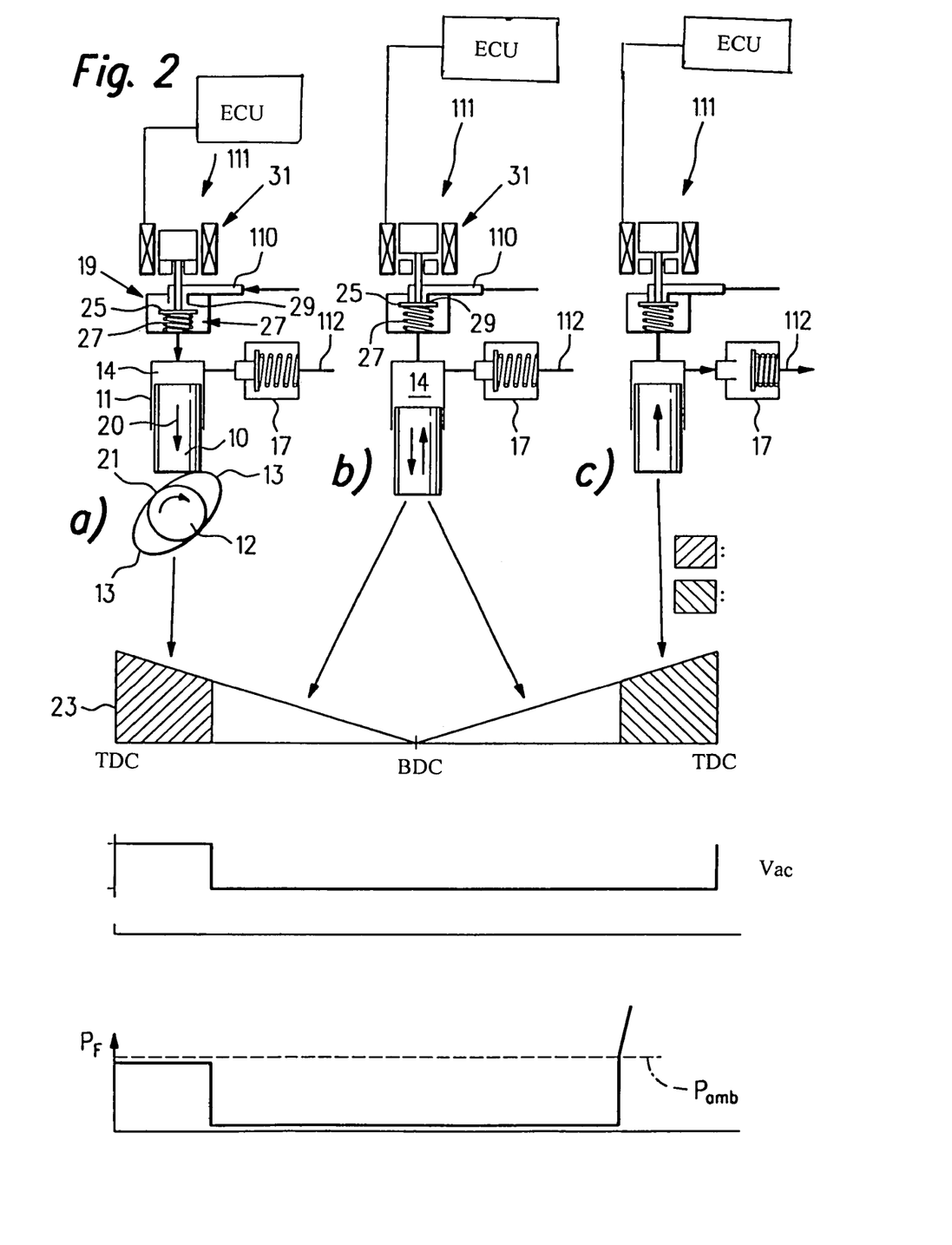
FIG. 2 is a schematic illustration of a high-pressure fuel pump for explaining a first method of the invention.

In FIG. 2a, a high-pressure fuel pump 111 is shown schematically. The high-pressure fuel pump 111 includes a piston 10, which is guided in a cylinder 11 and is driven by a camshaft 12 with two cams 13. The piston 10 and the cylinder 11 define a pumping chamber 14. The low-pressure fuel line 110 and a high-pressure fuel line 112 discharge into the pumping chamber 14. Between the high-pressure fuel line 112 and the pumping chamber 14, an outlet valve 17 is provided, which prevents a return flow of the fuel, located in the high-pressure fuel line 112, into the pumping chamber 14. The high-pressure fuel line 112 may discharge into a common rail 114, not shown, or may communicate directly with injectors 115 or injection nozzles.

FIGS. 2b and 2c show the high-pressure fuel pump 111 in other operating states. For the sake of simplicity, not all the details are shown in these views. For instance, the camshaft 12 is not shown.

Shown below FIGS. 2a through 2c are three graphs that serve to explain the mode of operation of the high-pressure fuel pump and of the methods of the invention. In all the graphs, the crankshaft angle is plotted on the X axis.

In the uppermost of these three graphs, the stroke 23 of the piston 10 is plotted qualitatively over the crankshaft angle. The relationship between the operating states shown in FIGS. 2a through 2c is expressed by arrows (without reference numerals).

Below that graph are two further graphs. In the middle of the three graphs, the switching state of the quantity control valve 19 (MSV) is plotted over the crankshaft angle.

In the lowermost graph, $P_F$ is the pressure in the pumping chamber 14 and is plotted qualitatively over the crankshaft angle.

The fuel present in the low-pressure fuel line 110 can be aspirated into the pumping chamber 14 via a quantity control valve 19 when the piston 10, as shown in FIG. 2a, is moving downward and is thus increasing the size of the pumping chamber 14. In FIG. 2a, the quantity control valve 19 embodied as a magnet valve is shown open. When the piston 10 moves from top dead center, not shown in FIG. 2a, in the direction of the arrow 20 to bottom dead center, also not shown in FIG. 2a, fuel flows from the low-pressure fuel line 110 via the quantity control valve 19 into the pumping chamber 14, until the quantity control valve is closed. This intake phase is represented in the middle graph of FIG. 2 by shading that begins at top dead center.

As soon as a sufficient quantity of fuel, which depends on the operating point of the engine, has been aspirated into the pumping chamber 14, the quantity control valve 19 is closed. This state is shown in FIG. 2b. The camshaft 12 and some reference numerals are not shown in FIGS. 2b and 2c for the sake of simplicity and clarity.

As a result of the closure of the quantity control valve 19, the pressure in the pumping chamber drops to the vapor pressure of the fuel. This course of the pressure is plotted in the lowermost of the three graphs.

When the camshaft 12 has rotated far enough that the point 21 touches the piston 10, bottom dead center is reached. The pumping stroke then begins. As soon as the piston 10 moves from bottom dead center to top dead center, the volume of the pumping chamber 14 decreases. As soon as the piston 10 has reached the position in which the quantity control valve was closed during the intake stroke, there is no longer any fuel in vapor form in the pumping chamber 14, and the pressure in the pumping chamber 14 rises sharply. When the pressure force in the pumping chamber 14 is greater than the sum of the pressure force exerted on the outlet valve 17 by the high-pressure fuel line 112 and the spring force of the outlet valve 17, the outlet valve 17 opens, and the pumping of fuel into the high-pressure fuel line 112 begins. This state is shown in FIG. 2c. In this so-called pumping phase, the quantity control valve 19 is closed (see also the shading in the uppermost of the three graphs).

During the pumping phase, which ends at top dead center, precisely that fuel quantity that was aspirated during the intake phase is pumped with the aid of the piston 10 out of the pumping chamber 14 into the high-pressure fuel line 112. The intake phase and the pumping phase, in this exemplary embodiment of a method according to the invention for controlling the pumping quantity of a high-pressure fuel pump 11, are in a first approximation symmetrical to top dead center.

In the exemplary embodiment shown in FIG. 2, the quantity control valve 19 includes an actuator 31 and a valve member 25. This valve member 25 is pressed by a compression spring 27 in the direction of a valve seat 29. In the exemplary embodiment of FIG. 2a, the actuator 31 is embodied as an electromagnet. If the actuator 31 is supplied with current (FIG. 2a), the valve member 25 lifts from the valve seat 29, counter to the force of the compression spring. It is self-evident that instead of an electromagnet 31, other actuators may be used, such as piezoelectric actuators, control motors, or hydraulic actuators. Alternatively, the actuator may be embodied as open when without current (not shown).

Once the intake phase is concluded, the actuator 31, in the exemplary embodiment of FIG. 2, is made currentless (see FIGS. 2b and 2c), so that the compression spring 27 presses the valve member 25 against the valve seat 19. As a result, the communication between the low-pressure fuel line 110 and the pumping chamber 14 is interrupted.

It is important in any case that the closing force of the compression spring 27 or of the actuator 31 be great enough to press the valve member 25 sealingly against the valve seat 29, even if the vapor pressure of the fuel to be pumped prevails in the pumping chamber 14 and if the pumping pressure built up by the prefeed pump 108 (see FIG. 1) prevails in the low-pressure fuel line 110.

In this switching position, fuel vapor initially develops in the pumping chamber 14, so that the pressure $P_F$ in the pumping chamber 14 drops to the vapor pressure of the fuel to be pumped. This course of the pressure in the pumping chamber 14 is shown qualitatively in the lowermost graph in FIG. 2. When the piston 10 now, during the pumping stroke, reaches the position at which the quantity control valve 19 was closed during the preceding intake stroke, there is no longer any fuel vapor in the pumping chamber 14, and a very fast pressure buildup begins in the pumping chamber 14. As soon as the pressure in the pumping chamber 14 exceeds the pressure in the high-pressure fuel line 112, the outlet valve 17 opens, and the fuel to be pumped is pumped into the high-pressure fuel line 112. This pumping phase ends when top dead center is reached. A new intake phase then begins.

However, the method of the invention is not limited to having the intake phase begin at top dead center, as shown in FIG. 2. It is also possible, during the course of the piston from top dead center in the direction of bottom dead center, to open the quantity control valve 19 at a later time and then to close it again once the desired fuel quantity has been aspirated.

In conjunction with FIGS. 3 and 4, a method of the invention in which the intake phase does not always begin at top dead center will now be described.

Figure 1:
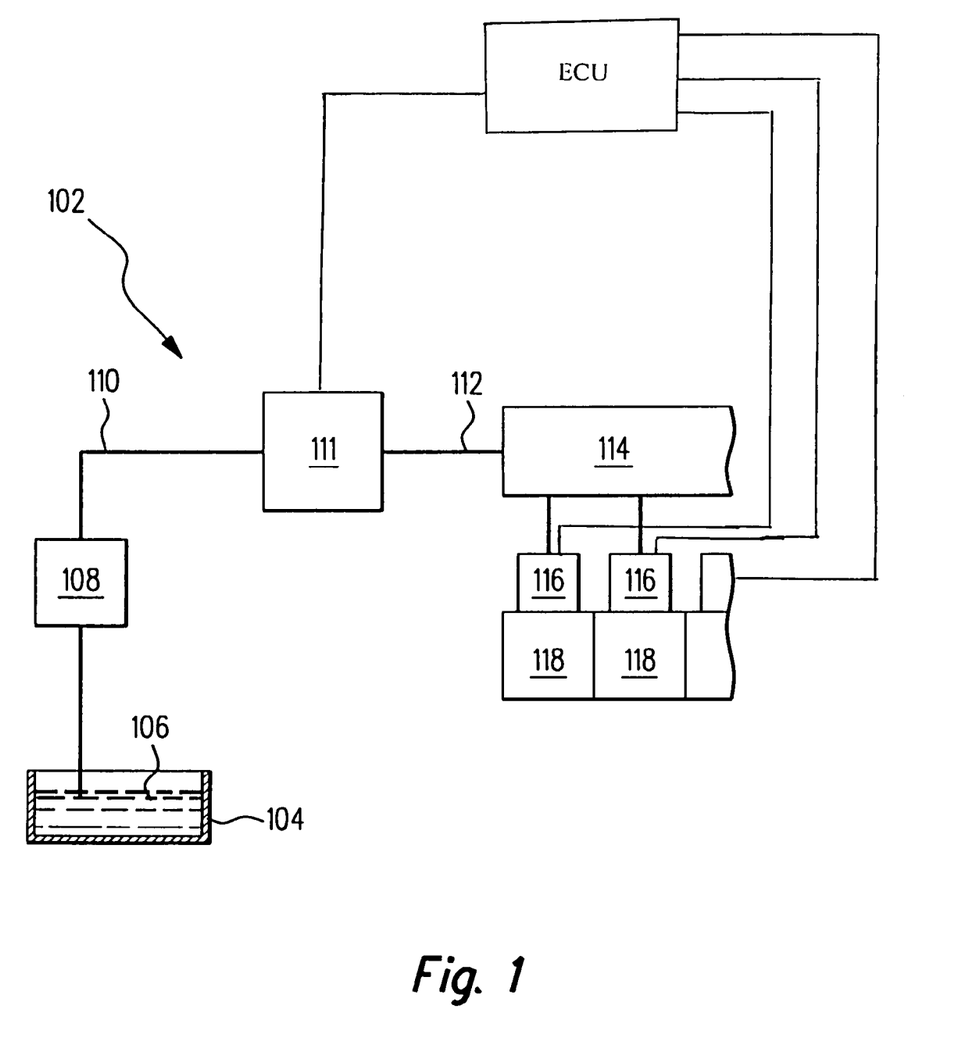
FIG. 1 is a block circuit diagram of a fuel injection system.
Figure 3:
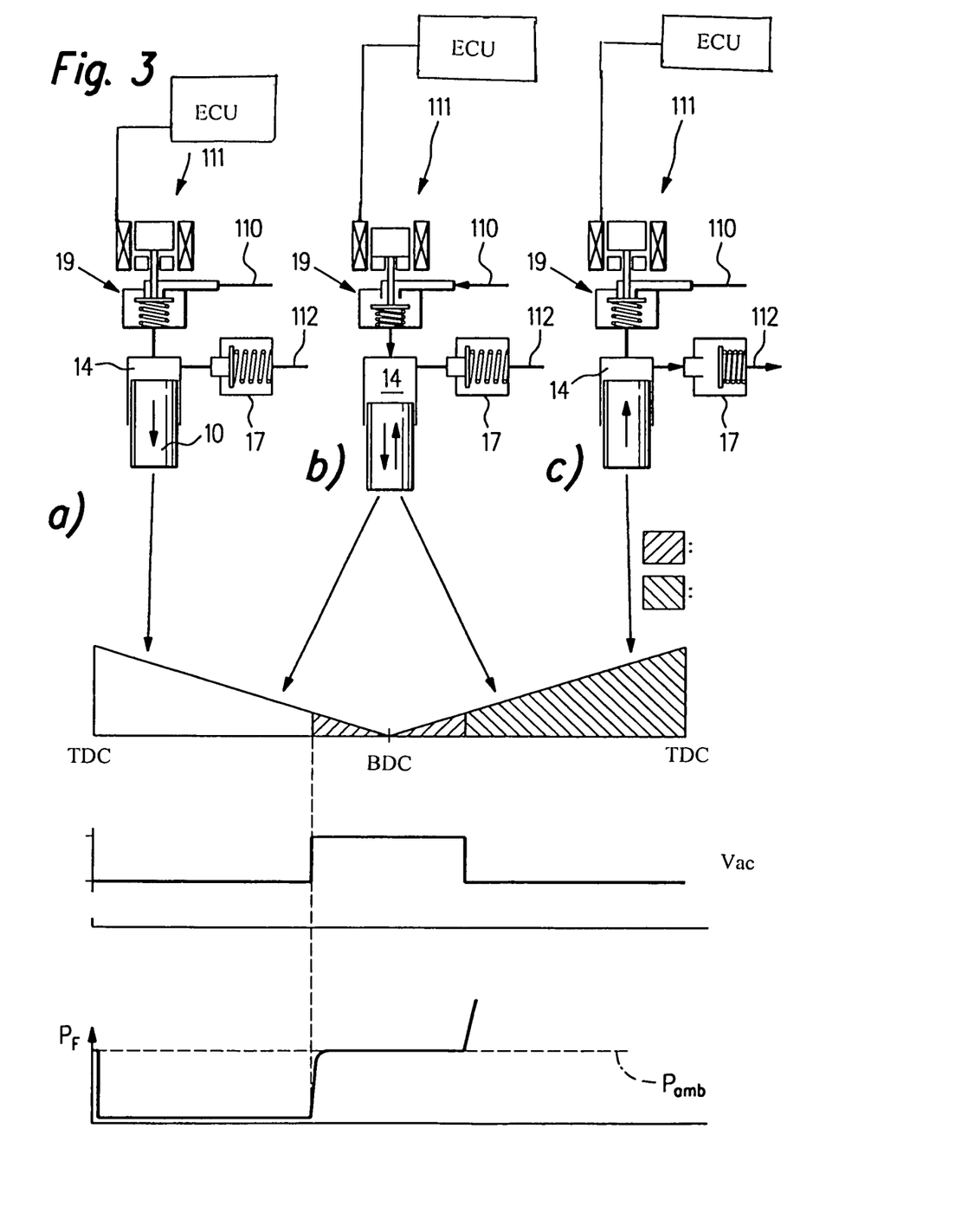
FIGS. 3 and 4 are simplified views of a high-pressure fuel pump for explaining a second method of the invention.
Figure 4:
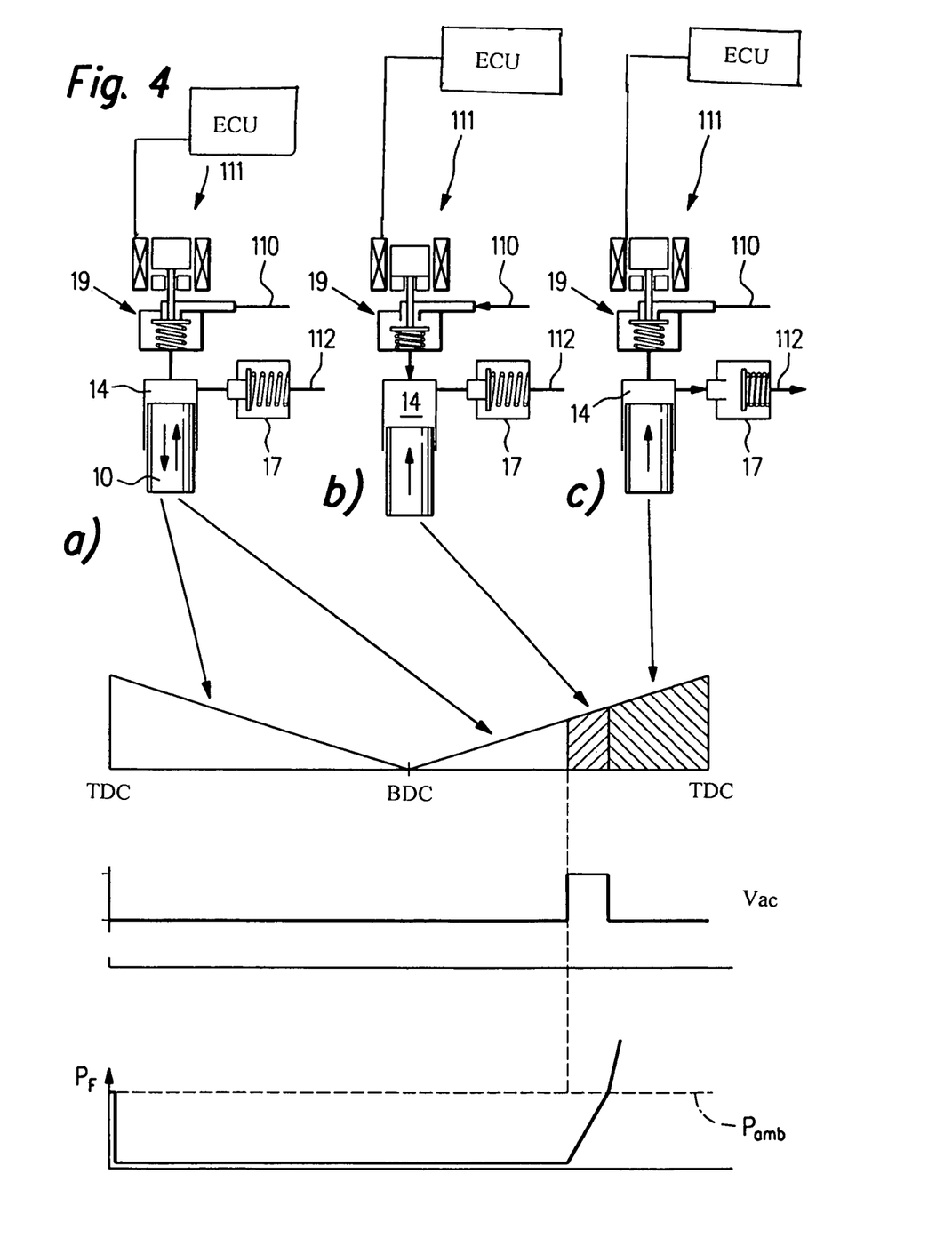

The high-pressure fuel pump 111 in FIGS. 3 and 4 is identical to the high-pressure fuel pump 111 described in conjunction with FIGS. 1 and 2. First, in conjunction with FIG. 3, the second method of the invention for controlling the pumping quantity of a high-pressure fuel pump in the upper partial-load range will be described. This means that the pumping phase (see FIG. 3c) extends over virtually the entire course of the piston from bottom dead center to top dead center.

Beginning at the top dead center of the piston 10, the quantity control valve 19 is first closed. When the piston 10 now moves in the direction of bottom dead center, the vapor pressure of the fuel to be pumped is established in the pumping chamber 14 (see also the lowermost graph in FIG. 3). Before bottom dead center is reached, the quantity control valve 19 is opened as a function of the pumping quantity to be pumped, and thus fuel can flow out of the low-pressure fuel line 110 into the pumping chamber 14. Because of the comparatively great pressure difference between the low-pressure fuel line 10 and the pumping chamber 14 that prevails at the onset of the intake phase, first, a relatively large fuel quantity rapidly flows into the pumping chamber 14, and second, a rapid pressure increase occurs in the pumping chamber 14. This process is illustrated qualitatively in the lower part of FIG. 3.

It is important in the method of the invention that a large fuel quantity can reach the pumping chamber 14 in a relatively short time. It must also be noted that in this method the aspirated fuel quantity is not proportional to the length of the intake phase, nor is it proportional to the distance that the piston 10 travels during the intake phase. In this method for controlling the pumping quantity, the aspirated fuel quantity depends essentially on the pressure difference between the low-pressure fuel line 110 and the pumping chamber 14, and on the flow resistances in the interior of the high-pressure fuel pump 111.

Once a sufficient quantity of fuel has been aspirated into the pumping chamber 14, the quantity control valve 19 is closed. At this instant, the piston 10, at the operating point shown in FIG. 3, is already on its way from bottom dead center toward top dead center. The intake phase ends only after the piston 10 has reached bottom dead center and has left that point again.

Immediately after the closure of the quantity control valve 19, a steep pressure increase takes place in the pumping chamber 14, so that the fuel is pumped into the high-pressure fuel line 112 (see FIG. 3c and the lowermost graph in FIG. 3).

The onset and end of the intake phase are calculated by a control and/or regulating unit such that in partial-load operation, the end of the intake phase is reached, first, the piston 10 moves from bottom dead center in the direction of top dead center, and second, the pumping phase is precisely long enough that the desired fuel quantity to be pumped is pumped into the high-pressure fuel line 112.

Since in this method of the invention the length of the intake phase is not coupled directly to the position of the piston 10, the length and/or the onset and end of the intake phase must be calculated taking the rpm of the high-pressure fuel pump 111, the pressure condition, the flow resistances, and the viscosity of the fuel suitably into account.

In this method of the invention as well, a check valve between the low-pressure fuel line 110 and the pumping chamber 14 can be dispensed with. A further advantage of the method of the invention is that only the fuel quantity that is expelled from the high-pressure fuel line 112 in the ensuing pumping phase is aspirated from the low-pressure fuel line 110 into the pumping chamber 14. This means that in this variant of the method of the invention as well, dissipation losses and heating up of the fuel are reduced to a minimum.

In conjunction with FIG. 4, the second method of the invention for the lower partial-load range will also be explained. In it, the situation that at first glance is surprising can happen in which the intake phase does not begin until the piston 10 is already moving back again from bottom dead center toward top dead center. This situation is shown in the uppermost graph in FIG. 4.

As can be learned from this graph and the graphs below it, the quantity control valve 19 is closed during the entire course of the piston 10 from top dead center to bottom dead center. Even beyond that, the quantity control valve 19 is still closed. Only once the piston has traveled approximately halfway from bottom dead center to top dead center is the quantity control valve 19 opened for a short time. In this short time, the fuel quantity to be pumped is aspirated from the low-pressure fuel line 110 into the pumping chamber 14. As soon as the quantity control valve 19 is closed again, the pumping phase begins, which again ends here at top dead center.

A comparison of the shaded areas, which represent the intake phase on the one hand and the pumping phase on the other, clearly shows that the fuel quantity aspirated during the intake phase is not coupled directly to the travel of the piston in that period. It is in fact true that the fuel quantity aspirated during the intake phase must be equal to the fuel quantity pumped during the pumping phase. From the example in FIG. 4, however, it becomes clear that the piston travels a very much shorter distance during the intake phase than during the ensuing pumping phase.

Figure 5:
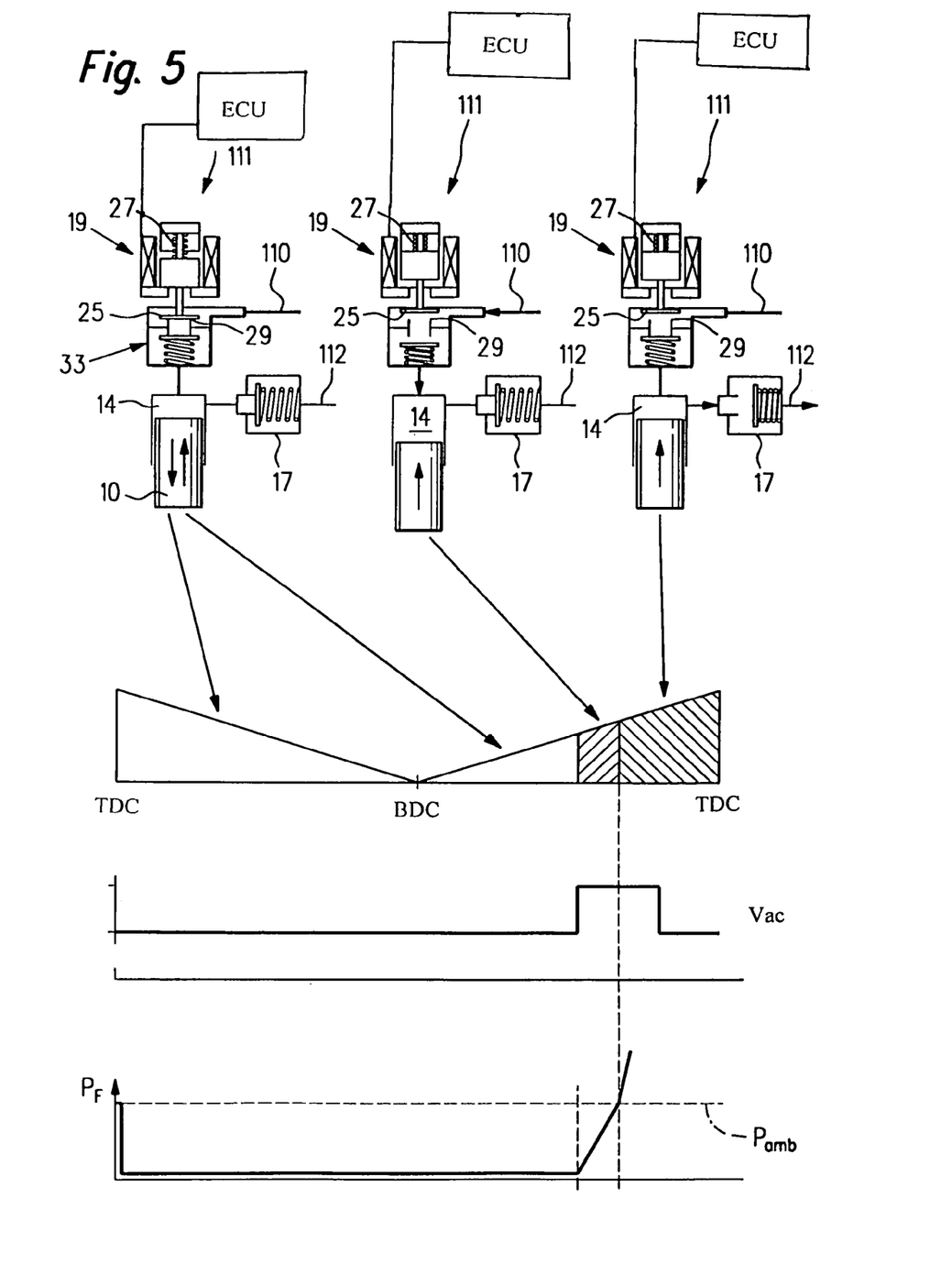
FIG. 5 shows a modified high-pressure fuel pump for explaining a further method of the invention.

In FIG. 5, a variant of a high-pressure fuel pump 111 of the invention is shown. In this variant, a check valve 33 is provided between the quantity control valve 19 and the pumping chamber 14. A further difference from the exemplary embodiments described above is that the quantity control valve 19 is embodied as opening outward. This means that the valve member 25 must be lifted, counter to the pressure prevailing in the low-pressure fuel line 110, from the valve seat 29 when the quantity control valve 19 is opened. On the other hand, as a result of this feature, the closing force of the actuator 31 is reinforced by the pressure difference between the low-pressure fuel line 110 and the pumping chamber 14. In this exemplary embodiment, the actuator 31 of the quantity control valve 19 is closed when without current. Otherwise, this high-pressure fuel pump 111 corresponds to the high-pressure fuel pumps 111 described above.

It is understood that an outward-opening quantity control valve 19 can also be used in conjunction with the methods for controlling a high-pressure fuel pump 111 that are described in FIG. 2.

The advantage of the check valve 33 is considered to be that by means of this check valve 33, which is located between the quantity control valve 19 and the pumping chamber 14, the intake phase is ended as soon as a pressure equilibrium is established between the pumping chamber 14 and a possible opening pressure of the valve 33 and the low-pressure fuel line 110. This is because the check valve 33 closes and the pumping phase begins regardless of whether the quantity control valve 19 had already been closed, or not.

This situation is illustrated by the middle graph in FIG. 5. That is, there the quantity control valve 19 is still open at the onset of the pumping phase. It is accordingly possible, by means of the check valve 33 of the invention, to make less-stringent demands of the control and/or regulating unit and of the quantity control valve 19, since now only the onset of the intake phase has to be calculated and controlled, while the end of the intake phase occurs on its own, without a control pulse from the control and/or regulating unit or a control motion of the quantity control valve 19.

Which of the variants of high-pressure fuel pumps 11 and methods for controlling this high-pressure fuel pump 11 will be employed in an individual case depends on the circumstances of the individual case and can easily be decided, without further action, by one skilled in the art of injection technology.

The foregoing relates to preferred exemplary embodiments of the invention, it being understood that other variants and embodiments thereof are possible within the spirit and scope of the invention, the latter being defined by the appended claims.

We claim:

1. A method for controlling the pumping quantity of a high-pressure fuel pump for an internal combustion engine, the fuel pump having a piston oscillating in a cylinder bore, the cylinder bore and the piston defining a pumping chamber, and the pumping chamber communicating on the intake side with a low-pressure fuel line and on the compression side with a high-pressure fuel line and having a quantity control valve located between the low-pressure fuel line and the pumping chamber, the method comprising by the following method steps:

interrupting the hydraulic communication between the pumping chamber and the low-pressure fuel line as soon as the piston moves from top dead center in the direction of bottom dead center;

opening the hydraulic communication between the pumping chamber and the low-pressure fuel line, so that the fuel quantity to be pumped is aspirated into the pumping chamber before the piston, on the way from bottom dead center to top dead center, has reached a position from which the aspirated fuel quantity can be pumped into the high-pressure fuel line, while the piston moves to top dead center.

2. The method in accordance with claim 1, wherein the hydraulic communication between the pumping chamber and the low-pressure fuel line is not opened until the piston has moved from bottom dead center in the direction of top dead center.

3. A computer program, wherein it is suitable for performing the method in accordance with claim 1, when it is executed on a computer.

4. The computer program in accordance with claim 3, wherein it is stored in a memory, in particular in a flash memory.

5. A control and/or regulating unit for operating an internal combustion engine, comprising a memory in which a computer program in accordance with claim 3 is stored.

6. A high-pressure fuel pump for an internal combustion engine, the fuel pump comprising a piston oscillating in a cylinder bore, the cylinder bore and the piston defining a pumping chamber, the pumping chamber communicating on the intake side with a low-pressure fuel line and on the compression side with a high-pressure fuel line, and a quantity control valve located between the low-pressure fuel line and the pumping chamber, the quantity control valve operating to interrupt the hydraulic communication between the low-pressure fuel line and the pumping chamber whenever the pressure in the pumping chamber is less than or equal to the vapor pressure of the pumped fuel.

7. The high-pressure fuel pump in accordance with claim 6, wherein the quantity control valve is open when without current.

8. The high-pressure fuel pump in accordance with claim 6, wherein the quantity control valve is closed when without current.

9. The high-pressure fuel pump in accordance with claim 6, wherein the quantity control valve is embodied as opening outward or opening inward.

10. The high-pressure fuel pump in accordance with claim 6, wherein the quantity control valve comprises a spring-loaded valve member and an actuator.

11. The high-pressure fuel pump in accordance with claim 9, wherein the quantity control valve comprises a spring-loaded valve member and an actuator.

12. The high-pressure fuel pump in accordance with claim 6, wherein the actuator is an electromagnet, a piezoelectric actuator, or a control motor.

13. The high-pressure fuel pump in accordance with claim 9, wherein the actuator is an electromagnet, a piezoelectric actuator, or a control motor.

14. The high-pressure fuel pump in accordance with claim 6, further comprising a check valve between the quantity control valve and the pumping chamber.

* * * * *